United States Patent
Pardo et al.

(10) Patent No.: US 9,718,717 B2
(45) Date of Patent: Aug. 1, 2017

(54) OPTIMISED HYDROTHERMAL CARBONISATION METHOD AND FACILITY FOR IMPLEMENTING SAME

(71) Applicant: DEGREMONT, Paris la Defense (FR)

(72) Inventors: Pierre Emmanuel Pardo, Orsay (FR); Jean Louis Bourdais, Chateaubriant (FR)

(73) Assignee: SUEZ INTERNATIONAL, Paris la Defense (FR)

(*) Notice: Subject to any disclaimer, the term of this patent is extended or adjusted under 35 U.S.C. 154(b) by 0 days.

(21) Appl. No.: 14/905,603

(22) PCT Filed: Jul. 15, 2014

(86) PCT No.: PCT/IB2014/063119
§ 371 (c)(1),
(2) Date: Jan. 15, 2016

(87) PCT Pub. No.: WO2015/008219
PCT Pub. Date: Jan. 22, 2015

(65) Prior Publication Data
US 2016/0194230 A1    Jul. 7, 2016

(30) Foreign Application Priority Data
Jul. 18, 2013    (FR) .................................... 13 57093

(51) Int. Cl.
*C02F 1/00*    (2006.01)
*C02F 1/66*    (2006.01)
(Continued)

(52) U.S. Cl.
CPC ............ *C02F 11/10* (2013.01); *F23G 5/0273* (2013.01); *F23G 7/001* (2013.01); *C02F 1/66* (2013.01);
(Continued)

(58) Field of Classification Search
CPC .... C02F 1/00; C02F 1/66; C02F 11/00; C02F 11/10; C02F 11/12; C02F 2209/00;
(Continued)

(56) References Cited

U.S. PATENT DOCUMENTS

| 3,962,076 A | 6/1976 | Hess et al. |
| 6,893,566 B2 * | 5/2005 | Fassbender ............... C02F 1/02 |
| | | 210/603 |

(Continued)

FOREIGN PATENT DOCUMENTS

WO    WO 2011/128824 A1 *   10/2011

OTHER PUBLICATIONS

International Search Report, dated Oct. 21, 2014, from corresponding PCT Application.

*Primary Examiner* — Natasha Young
(74) *Attorney, Agent, or Firm* — Young & Thompson

(57) ABSTRACT

A method and facility for the hydrothermal carbonization of pasty products or waste, or sewage sludge, in a pressurized reactor heated to carbonization temperature T0. Before entering the reactor, the products undergo: pressurization, and preheating in an exchanger, by a thermal fluid flowing in a closed loop, and receiving heat from products exiting the reactor; the thermal fluid is heated in the loop by an external heat source, downstream from the exchange with the products exiting the reactor, and upstream from the preheating of the products entering the reactor, and the temperature of the product to be treated, preheated by the thermal fluid, when it enters the reactor, is between the carbonization temperature T0 and T0-100° C. The product to be treated flows in at least one tube, where in at least one location therein, liquid is injected to create a liquid ring against the inner wall, and reduce pressure drops.

20 Claims, 1 Drawing Sheet

(51) Int. Cl.
    *C02F 11/00*     (2006.01)
    *C02F 11/10*     (2006.01)
    *C02F 11/12*     (2006.01)
    *F23G 5/00*     (2006.01)
    *F23G 5/02*     (2006.01)
    *F23G 5/027*     (2006.01)
    *F23G 7/00*     (2006.01)

(52) U.S. Cl.
    CPC ........... *C02F 11/12* (2013.01); *C02F 2209/02* (2013.01); *C02F 2209/03* (2013.01); *C02F 2301/066* (2013.01); *C02F 2303/22* (2013.01); *Y02W 10/40* (2015.05)

(58) Field of Classification Search
    CPC .............. C02F 2209/02; C02F 2209/03; C02F 2301/00; C02F 2301/06; C02F 2301/066; C02F 2303/00; C02F 2303/22; F23G 5/00; F23G 5/02–5/0273; F23G 7/00; F23G 7/001; Y02W 10/00; Y02W 10/40
    See application file for complete search history.

(56) References Cited

U.S. PATENT DOCUMENTS

2006/0096163 A1     5/2006   Dickinson et al.
2013/0207283 A1*   8/2013   Rabe ................. B01D 17/0205
                                                                       261/74

* cited by examiner

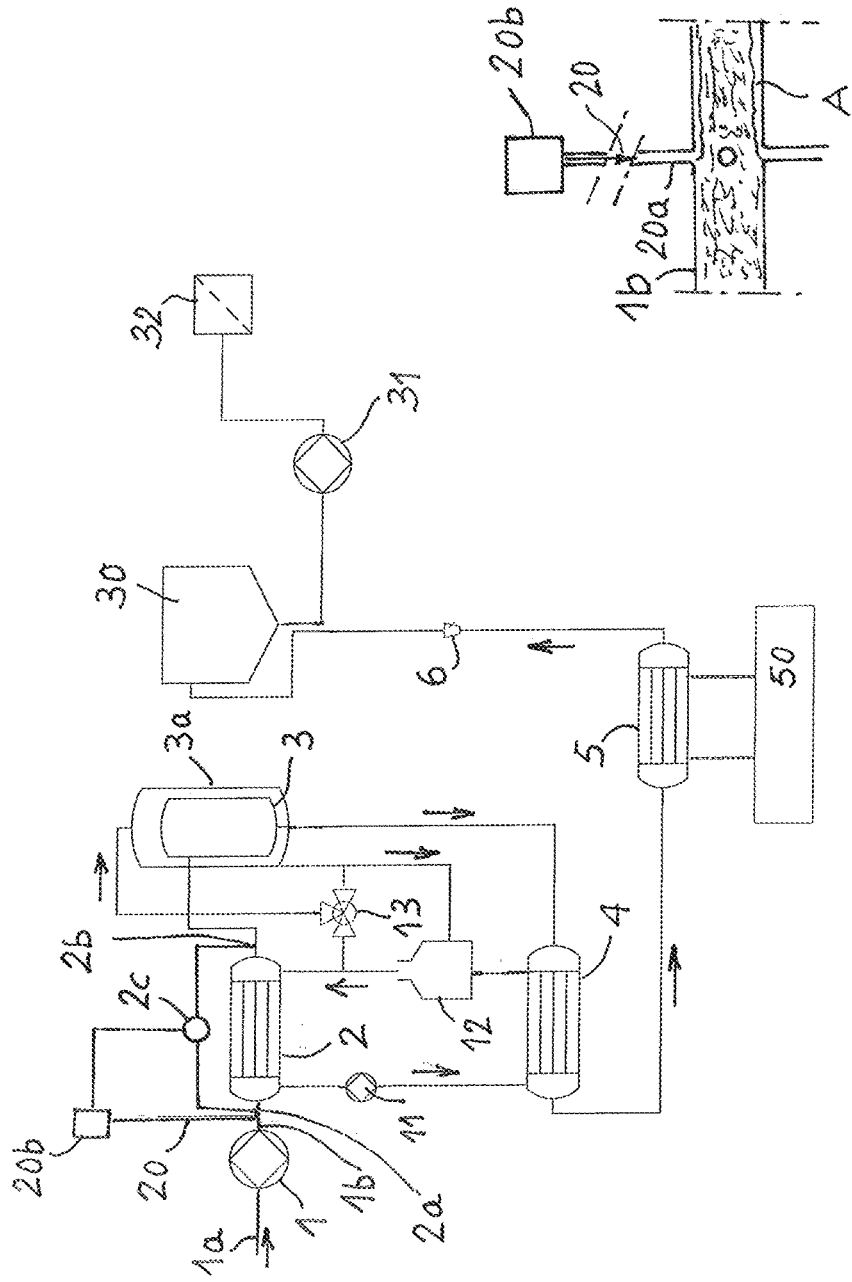
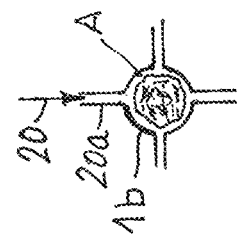
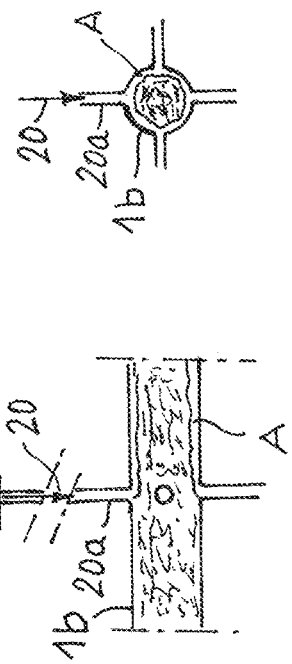
FIG. 1
FIG. 2
FIG. 3

OPTIMISED HYDROTHERMAL CARBONISATION METHOD AND FACILITY FOR IMPLEMENTING SAME

This application is a national stage application of PCT/IB2014/063119, filed on Jul. 15, 2014, now WO 2015/008219, which claims the benefit of and priority to French Patent Application No. FR1357093, filed on Jul. 18, 2013, the entire contents of which are each incorporated by reference herein.

The invention relates to a process for hydrothermal carbonization of pasty products or waste, or of treatment plant sludge, a process of the type of those according to which the products to be treated are introduced into a reactor under pressure and heated at a carbonization temperature T0, generally between 140° C. and 280° C., and the products to be treated, before being introduced into the reactor, undergo the following steps:

pressurization, preheating in an exchanger, with a thermal fluid that circulates in a closed loop, and that receives heat originating from the products leaving the reactor.

The field of the invention is that of the treatment of pasty products or waste, in particular those which are produced during the treatment of water (treatment plant sludge).

More specifically, the invention relates to an optimized process for hydrothermal carbonization of pasty products, in particular of dehydrated treatment plant sludge, that enables the treatment of large amounts of products while minimizing the dimensions of the equipment and while improving the chemical reaction.

It is recalled that hydrothermal carbonization is a process which, by increasing the temperature and pressure of a liquid-phase organic compound, aims to induce chemical reactions that make it possible, by the release of molecules of $CO_2$ and to increase the hydrophobicity of the organic product, which subsequently enables an optimal dehydration.

This type of thermal conditioning has already been used for compounds considered to be liquids, that is to say having a dryness of the order of 5% or less, which leads to high heat consumptions.

This type of thermal conditioning has also been used for compounds considered to be solids, that is to say pasty products or sludge having a dryness at least of the order of 15%, which may range up to 25 to 30%. In this application, the heating is carried out in two different ways:

either directly by injection of steam into the reactor, or indirectly by wall-heating of the reactor, that is to say that the heating fluid circulates in a jacket surrounding the reactor.

The direct route has the result of diluting the product, and of leading to pressure waves if the initial temperature of the reactor is too low; furthermore, in order to increase to high temperatures, in particular above 200° C., the steam pressures become very high.

The indirect route has the result of imposing limits on the size of the reactors; indeed, since the heat transfer occurs only at the wall of the reactor whereas it is necessary to heat the internal volume, there is rapidly a problem of a maximum size beyond which the product, especially the sludge, is not heated sufficiently; furthermore, intensive mixing is recommended to enable a homogenization of the product across the reactor. Finally, the indirect route leads to a stratification of the temperature in the flow direction of the product; the organic product only reaches its final temperature at the end of the reactor, which limits the residence time of the product at this final temperature.

In an example of operating via this indirect route, a preheating of the product to be treated by the product leaving the reactor is provided. For this, an oil loop, oil constituting a thermal fluid, allows the recovery of some of the heat from the carbonized product using a "hot carbonized product/oil" exchanger and a "hot oil/cold product to be treated" exchanger.

There is one problem with the exchanger.

For an initially solid product, that is to say having a dryness of the order of 15% at least, the problem of the heat exchange coefficients and also of scaling of the product is considerable. This is why, according to the prior art, two exchangers are provided, respectively "hot carbonized product/oil" and "hot oil/cold product to be treated" exchangers, with oil as intermediate thermal fluid, and not a single "hot product/cold product" exchanger since it would not be possible, in a concentric tube-in-tube heat exchanger, to thoroughly clean the outer tube that is subject to deposition. Moreover, the preheating of the organic product before injection into the reactor is partial, and limited to a temperature, in particular of around 90° C., significantly lower than that reigning in the reactor for preventing scaling. The product will only reach the carbonization temperature, in the reactor, after a heating time that is even longer when its temperature at the inlet is low. Therefore, the dimensions of the reactor will have to be relatively large in order to carry out, in a first phase, the heating at carbonization temperature, then, in a second phase, the carbonization.

The objective of the invention is especially to provide a hydrothermal carbonization process that makes it possible to minimize the thermal requirements in the reactor, in order to make it possible to construct large non-stirred reactors while controlling the exploitability problems of the exchangers.

The objectives presented above, and others that will appear subsequently, are achieved with the aid of the optimization of the hydrothermal carbonization process.

According to the invention, the process for hydrothermal carbonization of pasty products or waste, or of treatment plant sludge, of the type defined above, is characterized in that the thermal fluid is heated in the loop by an external heat source, downstream of the exchange with the products leaving the reactor, and upstream of the preheating of the products entering the reactor, and in that the temperature of the product to be treated, preheated by the thermal fluid, on entering the reactor is between the carbonization temperature T0, and T0-100° C.

Preferably, the dryness of the products to be treated is between 15% and 30%.

Advantageously, the product to be treated flows through at least one tube, including through the preheating exchanger, before it enters the reactor, and at at least one location of the tube, an injection of liquid is carried out in order to create a liquid ring against the inner wall of the tube, and to reduce the pressure drops.

Preferably, the liquid injected is an acid solution, which not only reduces the pressure drops, but also prevents, or at the very least reduces, scaling. The injection of acid solution may be carried out at various levels of the preheating exchanger, in order to control the clogging of the exchanger.

Advantageously, the pressure drop of the exchanger is controlled, and in the event of an increase in the pressure drop, the amount of acid solution injected for the liquid ring is increased.

The heat exchange coefficient of the exchanger is advantageously controlled, and in the event of a reduction in the exchange coefficient, the amount of acid solution injected for the liquid ring is increased.

The pressure in the reactor is generally between 20 and 35 bar. The thermal fluid is preferably an oil, but superheated water could be used.

The injection of acid as "liquid ring" is carried out after the pressurization of the sludge.

Advantageously, the process uses a wall-heated, non-stirred baffled reactor, in which the product flows in plug flow.

A cooling of the product is provided before storage and dehydration.

The invention also relates to a facility for implementing the process defined above, comprising:
- a reactor under pressure and heated at a carbonization temperature T0, generally between 140° C. and 280° C.,
- a pump for pressurizing the products in a feed line of the reactor,
- a heat exchanger for preheating the product to be treated with a thermal fluid that circulates in a closed loop and that receives heat, in another exchanger, originating from the product leaving the reactor, this facility being characterized in that it comprises a boiler for heating the thermal fluid of the closed loop, downstream of the exchange with the products leaving the reactor, and upstream of the preheating of the products entering the reactor, and in that the thermal power supplied by the boiler to the thermal fluid is sufficient so that the temperature of the product at the inlet of the reactor is between the carbonization temperature T0 and T0-100° C.

Preferably, the product to be treated flows through at least one tube, including through the preheating exchanger, before entering the reactor, and at at least one location of the tube, at least one transverse branch is provided and connected to the tube for an injection of liquid and to create a liquid ring against the inner wall of the tube.

Advantageously, the heat exchanger between the product to be treated and the thermal fluid is a concentric tube heat exchanger, and the product to be treated flows through the inner tube, into which the liquid for forming the liquid ring is injected, the thermal fluid passing through the outer tube.

Advantageously, the heat exchanger is elongated, comprising a minimum of bends in order to keep the liquid ring in position. In the case of numerous bends, several injections are provided.

The reactor may be wall-heated by hot oil, and be baffled, that is to say comprise a baffle in the path of the product. The reactor may be stirred so as to be cleaned by scraping the edges of the reactor.

The facility may comprise, at the outlet of the boiler, a three-way valve enabling the wall-heating of the reactor by the hot oil supplied by the boiler, this three-way valve enabling a temperature adjustment via mixing.

The invention consists, aside from the arrangements stated above, of a certain number of other arrangements which will be mentioned more explicitly below with respect to an exemplary embodiment described with reference to the appended drawing, but which is in no way limiting. Regarding this drawing:

FIG. 1 is a diagram of a facility for the implementation of the process according to the invention, FIG. 2 is a partial schematic longitudinal section of a tube for the circulation of the product to be treated, with liquid injection branches, in order to create a liquid ring, and FIG. 3 is a schematic cross section of the tube from FIG. 2 at the liquid injection branches.

The invention is based on an original approach that consists in combining:
- the qualities of oil/product tube-in-tube indirect exchangers,
- with the liquid ring technology,
- and the hydrothermal carbonization of sludge in a simple reactor.

By referring to FIG. 1 of the drawings, it can be seen that the products to be treated arrive via a line $1a$ in a pump 1.

On leaving, via the line or tube $1b$, the pressurization by the pump 1, an injection of dilute acid 20 is carried out with the liquid ring technology. The injection is carried out via at least one transverse branch $20a$, in particular which is radial (FIGS. 2 and 3), opening into the pressurized outlet tube $1b$ from the pump. Generally, at least two diametrically opposed injections of liquid are provided, and preferably four injections uniformly distributed over the periphery.

The "acid liquid ring" A (FIGS. 2 and 3) thus formed, due to the low speeds in the pipes and lack of mixing, remains stuck to the inner wall of the tube and thereby dissolves possible encrustations due to the heating of the product. Furthermore, this acid participates in the carbonization reaction and in the dehydratability of the carbonized product.

An exchanger 2, preferably of concentric tube-in-tube type, heats the product using a hot thermal fluid, preferably hot oil.

According to the invention, the oil is heated across a boiler 12 at a temperature of 150-350° C., preferably 250° C. The boiler is fed with fuel external to the facility, in particular with natural gas. The counter-current hot oil heats the product, in the exchanger 2, until it virtually reaches its definitive temperature 140-240° C., preferably 200° C.

The exchanger 2 is sized on the oil side so that the temperature of the oil leaving the exchanger is as low as possible, in particular from 10 to 80° C. above the temperature of the product to be heated, preferably 40° C. above.

The product enters a baffled reactor 3 through which it flows in plug flow up to the outlet. The reactor is surrounded by a jacket $3a$ forming a double wall in which the hot oil flows for heating the reactor. A three-way mixer valve 13, optionally mixed with pumping (not represented) makes it possible to adjust the temperature of the oil in the reactor jacket. The valve 13 comprises one way connected to the outlet of the boiler 12, one way connected to the inlet of the jacket $3a$, and one way connected to the outlet of the jacket $3a$, which outlet is also connected to the inlet of oil into the boiler 12. The product to be treated, already very hot on entering the reactor, has acquired a weak encrusting power in the reactor. A vent, not represented, is provided on the reactor 3 for discharging the gases produced.

On leaving the reactor, the product heats the counter-current oil loop through an exchanger 4. The oil loop is set in motion through a pump 11. The boiler 12 is located downstream of the exchanger 4 and upstream of the preheating by the exchanger 2.

The reactor 3 may be stirred in order to allow a renewal of the exchange layer in the event of a particularly encrusting product.

The remainder of the equipment 5, 6, 30, 31, 32, 50 completes the facility within the context of an ultradehydration by hydrothermal carbonization. An exchanger 5 makes it possible to cool the carbonized product, leaving the exchanger 4, owing to an intermediate fluid 50. A decompression tool 6, generally a valve, enables sending, without vaporization, to a storage tank 30. A pump 31 takes up the product leaving the tank 30, and enables the filtration of the product in a filter 32 in order to obtain an ultradehydrated product.

In order to further improve the process, the injection of acid as a liquid ring may be carried out at several locations of the exchanger 2 in order to enable a renewal of the liquid ring layer.

It should be noted that the liquid ring, which aims to reduce the pressure drop, could be obtained by injection of water, or advantageously of polymer, whilst the acid would be injected into the reactor 3.

Advantageously, the pressure drop of the exchanger, between the inlet 2a and the outlet 2b (FIG. 1) is controlled, in particular by a sensor 2c that is sensitive to the pressure difference between the inlet and the outlet. The sensor 2c transmits a signal, representing the pressure drop, to a unit 20b for injecting the acid solution. The unit 20b takes into account the change in the pressure drop. In the event of an increase in this pressure drop, the amount of acid solution injected for the liquid ring is increased, in order to reduce this pressure drop.

Advantageously, the temperature at the inlet 2a of the exchanger 2, the temperature at the outlet 2b of the exchanger 2 and the flow rate of the pump 1 on the product side are measured in order to calculate the amount of heat exchanged in the exchanger 2. The oil temperatures at the inlet and at the outlet of the exchanger 2 are also measured in order to calculate and monitor the heat exchange coefficient of the exchanger 2 and to adapt the amount of acid if the heat exchange coefficient decreases.

The concept of measuring the heat exchange coefficient k results from the relationship:

$Q = k \, S \, DT$ with

Q: heat exchanged,
k: heat exchange coefficient of the exchanger,
S: exchange area,
DT: logarithmic temperature difference between the two fluids.

Therefore, $k = Q/(S \, DT)$.

By measuring $Q = \text{flow rate} \times (T° \text{ inlet} - T° \text{ outlet})$ for one of the two fluids and DT, that is to say a calculation between the inlet and outlet temperatures of each product, k is deduced therefrom which, if it decreases, is a sign of fouling, which is also measured in other terms by the fact that it is necessary "to raise the temperature of the oil" in order to reach the same final temperature, that is to say to increase the DT in order to have the same Q since k decreases.

The exchanger 2 may be of rectangular type or other type and equipped with an automatic cleaning device.

The invention claimed is:

1. A process for hydrothermal carbonization of pasty products or waste, or of treatment plant sludge, in a reactor (3) under pressure and heated at a carbonization temperature T0, generally between 140° C. and 280° C., process wherein the products to be treated, before being introduced into the reactor, undergo the following steps:
pressurization,
preheating in an exchanger, with a thermal fluid that circulates in a closed loop, and that receives heat originating from the products leaving the reactor,
wherein the thermal fluid is heated in the loop by an external heat source (12), downstream of the exchange with the products leaving the reactor, and upstream of the preheating of the products entering the reactor,
the temperature of the product to be treated, preheated by the thermal fluid, on entering the reactor (3) is between the carbonization temperature T0 and T0-100° C.,
and the product to be treated flows through at least one tube (1b), including through the preheating exchanger, before entering the reactor, and at at least one location of the tube, an injection (20) of liquid is carried out in order to create a liquid ring (A) against the inner wall of the tube, and to reduce the pressure drops.

2. The process as claimed in claim 1, wherein the liquid injection step is carried out by at least two diametrically opposed liquid injections.

3. The process as claimed in claim 2, wherein the dryness of the products to be treated is between 15% and 30%.

4. The process as claimed in 2, wherein the liquid injected is an acid solution.

5. The process as claimed in claim 2, wherein the pressure in the reactor is between 20 and 35 bar.

6. The process as claimed in claim 2, wherein the thermal fluid is oil.

7. The process as claimed in claim 1, wherein the dryness of the products to be treated is between 15% and 30%.

8. The process as claimed in 1, wherein the liquid injected is an acid solution.

9. The process as claimed in claim 8, wherein the injection of acid solution is carried out at various levels of the preheating exchanger, in order to control the clogging of the exchanger.

10. The process as claimed in claim 9, wherein the pressure drop of the exchanger is controlled, and in the event of an increase in the pressure drop, the amount of acid solution injected for the liquid ring is increased.

11. The process as claimed in claim 9 wherein the exchange coefficient of the exchanger is controlled, and in the event of a reduction in the exchange coefficient, the amount of acid solution injected for the liquid ring is increased.

12. The process as claimed in claim 1, wherein the pressure in the reactor is between 20 and 35 bar.

13. The process as claimed in claim 1, wherein the thermal fluid is oil.

14. A facility for hydrothermal carbonization of pasty products or waste, or of treatment plant sludge, comprising:
a reactor (3) under pressure and heated at a carbonization temperature T0, generally between 140° C. and 280° C.,
a pump (1) for pressurizing the products in a feed line (1b) of the reactor,
a heat exchanger (2) for preheating the product to be treated with a thermal fluid that circulates in a closed loop and that receives heat, in another exchanger (4), originating from the product leaving the reactor, wherein the facility further comprises a boiler (12) for heating the thermal fluid of the closed loop, downstream of the exchange with the products leaving the reactor, and upstream of the preheating of the products entering the reactor,
the thermal power supplied by the boiler to the thermal fluid is sufficient so that the temperature of the product at the inlet of the reactor is between T0 and T0-100° C., T0 being the carbonization temperature,
and the product to be treated flows through at least one tube (1b), including through the preheating exchanger (2), before entering the reactor, and at at least one location of the tube, at least one transverse branch (20a) is provided and connected to the tube for an injection (20) of liquid and to create a liquid ring (A) against the inner wall of the tube.

15. The facility as claimed in claim 14, wherein the heat exchanger (2) between the product to be treated and the thermal fluid is a concentric tube heat exchanger, and the product to be treated flows through the inner tube, into which the liquid for forming the liquid ring is injected, the thermal fluid passing through the outer tube.

16. The facility as claimed in claim 14 wherein the reactor (3) is wall-heated by hot oil, and is baffled.

17. The facility as claimed in claim 14 wherein the reactor is stirred so as to clean the edges of the reactor by scraping.

18. The facility as claimed in claim 17, further comprising, at the outlet of the boiler (12), a three-way valve (13) enabling the wall-heating of the reactor by the hot oil supplied by the boiler, said three-way valve enabling a temperature adjustment via mixing.

19. The facility as claimed in claim 15 wherein the reactor (3) is wall-heated by hot oil, and is baffled.

20. The facility as claimed in claim 15 wherein the reactor is stirred so as to clean the edges of the reactor by scraping.

* * * * *